J. E. SECORD.
RAKES FOR SALT-BOILERS.

No. 188,680. Patented March 20, 1877.

Attest:
E. E. Court
Chas. Jacobsen

Inventor:
John E. Secord,
by Louis Bagger & Co.
Att'ys

UNITED STATES PATENT OFFICE.

JOHN E. SECORD, OF PORT SANILAC, MICHIGAN, ASSIGNOR OF ONE-THIRD HIS RIGHT TO JAMES H. HUYCK, OF SAME PLACE.

IMPROVEMENT IN RAKES FOR SALT-BOILERS.

Specification forming part of Letters Patent No. 188,680, dated March 20, 1877; application filed October 30, 1876.

*To all whom it may concern:*

Be it known that I, JOHN E. SECORD, of Port Sanilac, in the county of Sanilac, and State of Michigan, have invented certain new and useful Improvements in Rakes for Salt-Boilers; and I do hereby declare that the following is a full, clear, and exact description thereof, which will enable others skilled in the art to which it appertains to make and use the same, reference being had to the accompanying drawings, which form a part of this specification.

The object of this invention is to dispense with the manual labor in raking salt from the bottom of salt pans or boilers; and it consists in the construction and arrangement of one or more sets of rakes, operated by machinery, substantially as hereinafter more fully described.

Figure 2:
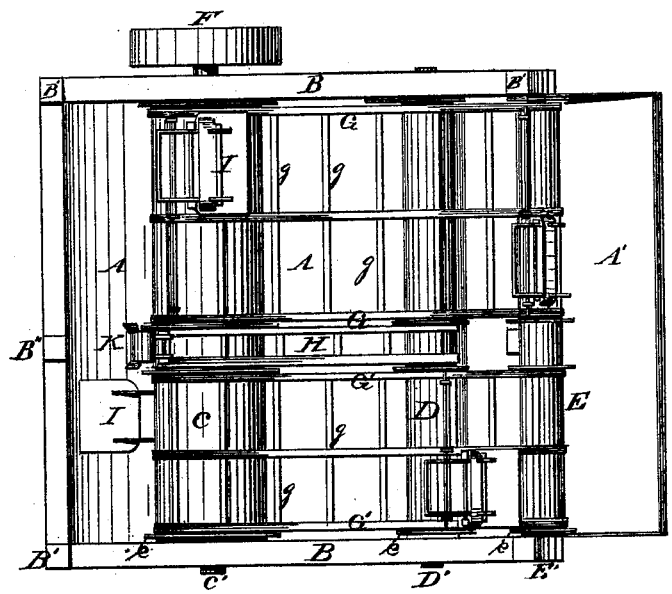
Figure 1:
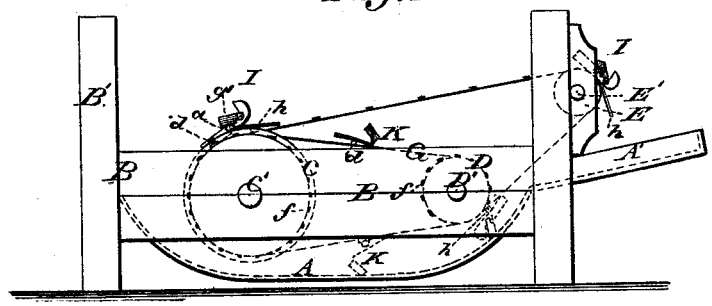
Figure 3:
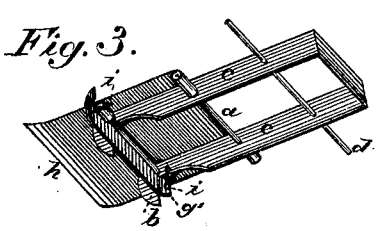

In the drawing, Figure 1 is a side elevation, Fig. 2 is a top plan, and Fig. 3 is a perspective view, of one of the rakes, detached from the machine.

Similar letters of reference indicate corresponding parts in all the figures.

A is the pan, which is of the usual construction, having the shallow projecting portion or raking-board A'. B is the frame, within which pan A is mounted, and which consists of posts or uprights B' and cross-pieces B. C' and D' are shafts, carrying drums C D, having their bearings in the side pieces B; and a third shaft, E', which carries a drum, E, is journaled in two of the end posts B', as shown. F is a pulley, drum, or gear-wheel, by which the machinery is operated by suitable connection with a steam-engine or other motive power.

G G' are endless chains, passing over drums C and D, and spaced by means of iron rods $g$. Drums C, D, and E have longitudinal ribs $f$, made of half-round iron, for the purpose of preventing chains G, G', and H from slipping when the drums revolve. $e$ are annular flanges, the object of which is to prevent the chains from moving sidewise on the drums.

The rakes I are arranged in sets upon chains G G', being pivoted on rods $d$, secured crosswise upon the chains. Each rake consists of a bent arm, $c$, which terminates in two hooks, $b$, and has a cross-piece, $a$. Arm $c$ swings upon the rod $d$, so that when the rake is traveling back on the endless chain from the raking-board it will lie flat on the chains; but when it reaches the opposite end of the pan, back of drum C, it will tip over by its own weight, as represented in Fig. 1. $g'$ is a narrow piece of sheet metal, hinged in the arm $c$ just below the hooks $b$, so as to rest against these hooks when the rake is in operation; and $h$ is another broader piece of sheet metal, hinged upon the cross-piece $a$, below arm $c$ and rake-blade $g'$, and reaching some distance back of these. This piece of metal I call the "sweep." The rake-blade $g'$ and sweep $h$ are united by a short chain, $i$, on each side of the rake-arm $c$, so that when the blade $g'$ reaches the raking-board A', after passing along the bottom of the pan and carrying a load of salt before it, the sweep $h$ will, when its under edge comes in contact with the slanting surface of the raking-board, pull upon the blade $g'$, so as to tilt it up in a vertical position parallel to itself, thereby emptying out the salt, which is swept higher up on the raking-board by the sweep $h$, from where, after draining, it is removed in the usual manner, while the rake I commences its backward travel, ready to repeat the operation when the other end of drum C is reached.

K is an auxiliary rake or scraper, which is only used in pans that have middle posts B'', for the purpose of preventing that narrow strip of salt that settles in the pan between these posts from burning to the bottom. As the rakes I, arranged on either side of the middle posts, cannot reach in between these posts, the scoop or scraper K will, at regular intervals, loosen the salt that is deposited there and throw it out to the sides, where it is within reach of the rakes I.

By reference to the drawing it will be observed that rakes I are so disposed upon the endless chains G G' as to occupy only one-half of the width of each set of chains, the rakes being arranged alternately on each side. This is for the purpose of giving sufficient time for the deposit of a thin layer of salt between the courses of each rake, and also for the purpose of effecting a better and more thorough scraping of the bottom of the pan.

This invention may be used with equal facility and advantage in pans in which the brine is evaporated by the use of fire, or in pans or vats in which steam-pipes running through the vats are employed for evaporating, it being only necessary in the latter case to run the steam-pipes through the vat crosswise between the chains G, G', and H. Besides dispensing with the manual labor of raking, it performs the work more evenly and regularly, as all parts of the bottom of the pan are sure to be scraped at regular intervals, which is not always the case with hand-raking, which is apt to leave spots or patches on the bottom untouched. The power required to propel the rakes could be furnished, without additional expense, from the fuel used for evaporating the brine, so that not only labor, but considerable time and expense, are saved, as generally two or more sets of men have to be employed in raking, owing to the excessive heat, which renders prolonged labor at the pan impossible.

Having thus described my invention, I claim and desire to secure by Letters Patent of the United States—

The self-emptying rake or scraper I herein described, consisting of a bent arm, $c$, swung upon a rod or cross-piece, $d$, and having hooks or supports $b$, rake-blade $g'$, sweep $h$, and chains $i$, all constructed, combined, and operating substantially in the manner and for the purpose shown and specified.

In testimony that I claim the foregoing as my own I have hereto affixed my signature in presence of two witnesses.

JOHN E. SECORD.

Witnesses:
GEORGE HUYCK,
RUDOLPH PLATTS.